April 9, 1935. C. E. REED 1,997,345
ROLLER CUTTER ASSEMBLY FOR EARTH BORING DRILLS
Original Filed March 17, 1932
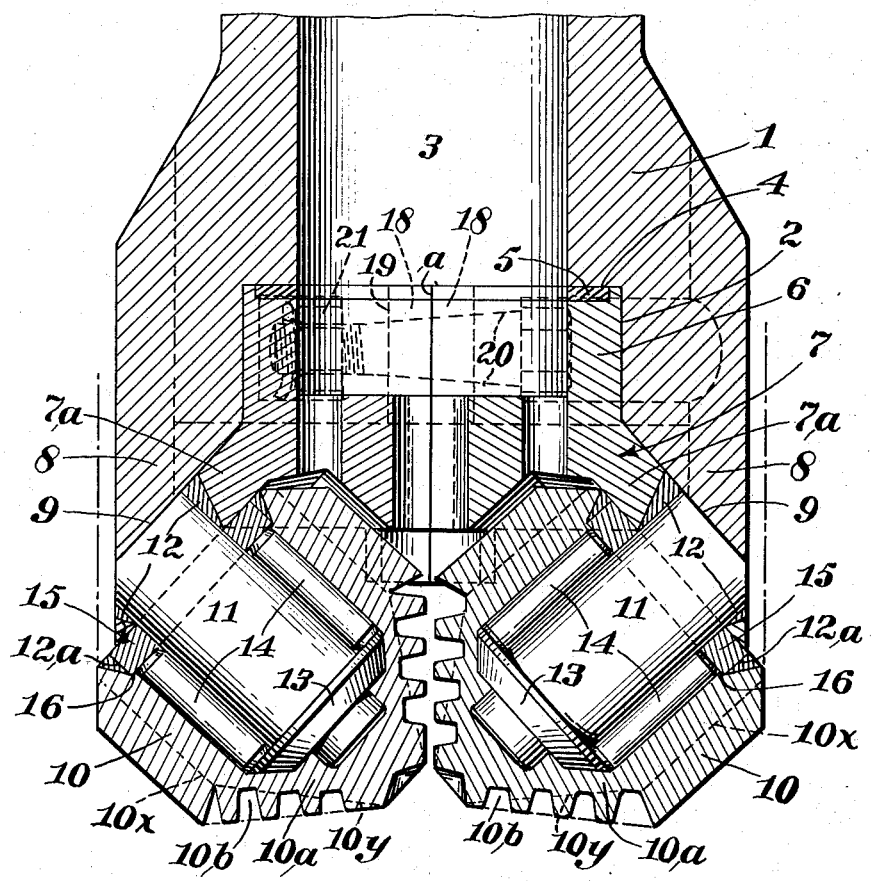
Inventor:
Clarence E. Reed,
By Spear, Donaldson & Hall
Attorneys.

Patented Apr. 9, 1935

1,997,345

UNITED STATES PATENT OFFICE 1,997,345

ROLLER CUTTER ASSEMBLY FOR EARTH BORING DRILLS

Clarence E. Reed, Wichita, Kans.

Original application March 17, 1932, Serial No. 599,541. Divided and this application January 23, 1934, Serial No. 707,977

17 Claims. (Cl. 255—71)

This specification is a division of that filed March 17, 1932, Serial No. 599,541, and it concerns the roller cutter assembly including the means for mounting the roller cutter of an earth boring drill.

The invention is illustrated in the accompanying drawing showing a central vertical section through a bit head and a roller cutter assembly carried thereby.

In the drawing 1 indicates a bit head in one piece having a socket 2 centrally disposed therein which socket is of substantially cylindrical form. The bit head has a central bore 3 communicating with this socket and a shoulder 4 is provided upon which a suitable washer 5 bears to seal the joint between said shoulder and the upwardly extending cylindrical shank or upper part 6 of the roller cutter carrier which is indicated generally at 7. The end walls 8 of the bit head are carried down below the central socket 2 and these walls on their inner sides at 9 are flared downwardly and outwardly. The roller cutters comprise cylindrical base portions 10 and frusto-conical portions 10a at the inner ends of the cylindrical portions. These cutters are provided with teeth, the depth of which along the cylindrical portion of the roller cutter, is indicated by the dotted line 10x and the depth of the teeth on the frusto-conical portion of the cutter is indicated by the dotted line 10y. The teeth along the cylindrical portion of the cutter are derived by grooving the cylindrical surface longitudinally and the teeth at the frusto-conical portion of the cutter are derived by circumferential grooves such as 10b intersecting the radial grooves indicated by the dotted lines 10y.

The cutters are mounted on spindles 11 which incline downwardly and inwardly from the walls of the carrier member 7 so that the axes of these spindles converge at the vertical axial line of the bit head. The walls 7a of the cutter carrier are flared downwardly and outwardly and on their outer sides they find a bearing against the flaring walls 9 of the bit head. The axes of the spindles are at substantially right angles to these flaring walls 7a and said spindles are welded to these flaring walls integrally at the points 12.

The spindles at their inner ends are provided with flanges or abutments 13 extending circumferentially about the spindles and integral therewith. Between the spindles and the roller cutters, roller bearings 14 are interposed, which roller bearings at their inner ends contact with the abutments or flanges 13. At the bases of the roller cutters a ring 15 is mounted within the open end of the cutter which ring bears on a shoulder 16. The ring is welded in place as at 12a and prevents an abnormal inward endwise movement of the cutter by contact of the outer ends of the roller bearings with the inner faces of these rings. The frusto-conical portions of the roller cutters cover the inner ends of the spindles. The cutter carrier member is formed in sections divided from each other on a transverse plane cutting the vertical axis of the bit head, the line of separation being indicated at a. In making the assembly, the roller cutters are slipped onto the spindles. The roller bearings are then inserted between the spindles and the roller cutters. The rings 15 are then placed in position and the welding is done at 12a to integrally unite the rings with the roller cutters and to retain the roller bearings in place. After these parts have been assembled the spindle is inserted in the opening in the wall of the carrier section and welded integrally in place at 12. From this assembly it will be noted that each section of the cutter carrier, together with its integrally mounted spindle and roller cutter, can be handled as one body for insertion into the bit head. Each section of the carrier is provided with a lug 18 and these lugs are received face to face within a lateral notch or opening 19 in the side walls of the bit head. The sections having been placed within the bit head with the lugs 18 assembled in the recess 19, a bolt 20 is inserted through a portion of the bit head and through the lugs or ears 18 and by turning a nut 21 the bolt will be drawn into position, and being of wedge shape at the point where it passes through the lug 18, said lug will be drawn tightly into the recess 19.

The passageway or bore 3 of the bit head is adapted to conduct flushing fluid to the cutters and for this purpose the cutter carrier is provided with openings 22, one of which, as shown in Fig. 1, lies over the upper corner of the adjacent cylindrical base portion of the roller cutter so as to direct the flushing fluid to the upper ends of the teeth extending longitudinally of the cylindrical portions of the cutter.

Reverting to the roller bearing feature of the roller cutters, it will be noted that these bearings are inserted into place between the spindles and the inner walls of the bore of the cutters without the employment of any ports or apertures in the wall of the cutter, which, after the insertion of the anti-friction bearings into place, must be closed and thereby leave a more or less rough surface against which the roller bearings must contact.

In the present construction, the roller bearings are inserted through the open end or base of the roller cutter and thereafter the ring 15 is placed in position and secured by welding.

From this construction it will be observed that all contacting surfaces of the roller bearings find an opposed contacting surface which is smooth throughout and is free from any roughness which would ensue if the roller cutter were inserted through an aperture, and some means used for closing this aperture after the anti-friction bearing member had been placed in position.

It will be observed that the spindle flange or enlargement 13 has a side wall, facing the spindle support with the end faces of the roller bearings contiguous said side wall; and on its other side, facing the free end of the spindle, the flange has a bevelled wall. The periphery of the flange is cylindrical. At the free end of the spindle there is a reduced diameter cylindrical pilot bearing. The roller cutter has a cylindrical bore complemental to that portion of the peripheral bearing surface of the spindle constituting a raceway for the roller bearings, and within the apex portion of the cutter the wall of the bore has wall portions complemental to and frictionally contacting surface portions at the end of the spindle.

The cutter assembly presents two walls directly opposite each other, one of which i. e. the ring 15 is on the cutter and the other of which, i. e. the flange 13, is on the spindle and between these walls the roller bearings are located, whereby the end thrust of the cutter towards the free end of the spindle is transmitted through the roller bearings to the spindle.

The roller bearings at their inner ends contact only the spindle and are free from end thrust of the roller cutter outwardly towards the spindle support. They sustain main radial loads, all other loads imposed upon the cutter being sustained by the spindle.

The formation of the spindle at its free end includes annular bearing surfaces at an angle to each other or surfaces intersecting each other.

The teeth on the frusto-conical zone of the cutter are in circumferential rows, the grooves between the rows being wider at the crests than the cutting edges of the teeth. The toothed base zone of the cutter is at an inclination to the frusto-conical zone and dominates the rolling motion thereof.

I claim:

1. In a roller boring drill a support, a spindle supported at its outer end thereby and extending downwardly and inwardly therefrom, an approximately frusto-conical roller cutter enclosing the free end of the spindle, roller bearings on said spindle, said spindle having an end thrust bearing positioned for relieving said roller bearings of all end thrust of said cutter outwardly from the axis of rotation of the drill.

2. In a roller boring drill according to claim 1, having an additional annular frictional bearing on the spindle cooperating with the cutter for sustaining lateral thrusts of the cutter.

3. In a roller boring drill, a cutter having a toothed base portion inclined to a frusto-conical portion having widely spaced rows of teeth thereon, rolling bearings within the base portion sustaining radial loads, and a spindle supported at one end and having its other end enclosed within the frusto-conical portion of the cutter, the latter end including a plurality of intersecting bearing surfaces sustaining thrust of said cutter outwardly from the axis of rotation of the drill.

4. The combination with a drill bit, a head and spindles supported at their outer ends thereby and projecting downwardly and inwardly, each spindle having peripheral surfaces constituting a raceway for roller bearings, another surface spaced from said roller bearings and receiving all the end thrust of the cutter, and an additional bearing receiving lateral thrusts of the cutter, and a cutter enclosing the free end of said spindle and having complementary bearing surfaces, and roller bearings cooperating with the raceway and the surface complemental thereto on the cutter.

5. In a rotary roller drill as specified in claim 4, opposing surfaces on the spindle and cutter cooperating with the ends of the roller bearings for retaining the cutter on the spindle.

6. A well drill comprising a head, a spindle support, a separately formed spindle, a conical roller cutter shell surrounding the free end of said spindle and having a running fit thereon, rolling bearings sustaining the radial main drilling load and arranged between the said shell and the periphery of said spindle, and a flange on said spindle sustaining all the end thrust of the cutter towards the head.

7. A drill bit including a head, downwardly and inwardly inclined spindles thereon, a rolling bearing race on the periphery of each spindle, a pilot frictional bearing at the free end thereof, each spindle having a part located between the last named bearing and the race, said part being of greater diameter than the race portion of the spindle, and sustaining all end thrusts of the cutter, a frusto-conical roller cutter shell on each of said spindles enclosing the same and having bearing surfaces complemental to the said race and the pilot bearing, and rolling bearings for carrying the radial drilling loads interposed between the cutter and spindle.

8. In a rotary roller deep well drill and in combination, a spindle support, a spindle supported at one end thereby and having its opposite end free, a cutter shell having a toothed periphery of general frusto-conical shape, roller bearings sustaining the radial load, said spindle having an annular bearing at the free end thereof for sustaining all end thrust of the cutter towards the support and for maintaining the cutter out of bearing contact with the end surfaces of the roller bearings, said roller bearings being positioned between said annular bearing and the support, and having peripheral bearing contact with a peripheral surface of the spindle and a complemental bearing surface of the cutter shell, and said shell enclosing said spindle, said annular bearing, and the rolling bearings.

9. In a roller boring drill, a cutter having a toothed base portion inclined to a frusto-conical portion provided with widely spaced circumferentially disposed rows of teeth, rolling bearings within the base portion sustaining the radial load, and a spindle having a free end within the frusto-conical portion of the cutter, said free end including intersecting annular bearing surfaces for sustaining the thrusts perpendicular to said frusto-conical portion.

10. In a drill of the type described and in combination, a cutter having a base cutting zone with the lengthwise edges of its teeth disposed substantially parallel to the axis of the cutter and a cutting zone defining substantially the surface of a cone, said cutter having a bore with a plurality of sections of different diameters, a spindle support, a spindle projecting therefrom having an enlargement spaced a distance from the support for sustaining end thrust of the cutter, the free end of the spindle being a cylindrical projection of materially less diameter than said enlargement and cooperating with the bore of the cutter at the apex end of the cutter, and a plurality of roller bearings cooperating with the periphery of the spindle between the enlargement and the support, and with the bore of the cutter of greatest diameter.

11. In a drill of the type described and in combination, a support and a spindle supported at one end thereby and having its opposite end free and provided with an annular portion sustaining all end thrusts of the cutter towards the support, said portion being spaced a distance from the support and having a side wall facing the support and with a bevelled wall, a roller cutter having a cutter zone defining the side wall of a cone and a base portion provided with radial teeth, the lengthwise edges of which are disposed at an obtuse angle to said conical surface, said cutter having a bore with a surface substantially parallel with the side wall of the cone and roller bearings with end faces contiguous said side wall of the annular portion.

12. In a roller cutter unit including a cutter, having a bore, a spindle having a free end, and roller bearings, bearing surfaces of the cutter bore and spindle respectively contacting the peripheries of the roller bearings, two walls positioned directly opposite each other, one of which is on the cutter and the other on the spindle, between which walls the roller bearings are located, and whereby the end thrust of the cutter towards the free end of the spindle is transmitted through the roller bearing to the spindle.

13. In a roller cutter earth boring drill, the combination of a drill head, a plurality of spindles carried thereby, cutters rotatively associated with the spindles, said cutters having each a wide base cutting zone which is inclined to a frusto-conical toothed cutting zone on said cutter and dominates the rolling motion thereof, said teeth on the frusto-conical cutting zone being arranged in spaced circumferential rows with grooves wider between the crest than the cutting edges of the teeth, and roller bearings positioned on each spindle normally sustaining radial thrusts of the cutter mounted for rotation on said roller bearings and free of end thrust contact with the cutters in a direction outwardly from the vertical axis of the drill, said spindle sustaining all said outward end thrusts of the cutter.

14. In a roller cutter earth boring assembly, the combination of a drill head, a plurality of spindles carried thereby, cutters rotatively associated with the spindles, said cutters each having a single row of wide teeth on the base cutting zone which is inclined to a frusto-conical toothed cutting zone on said cutter and dominates the rolling motion thereof, and roller bearings positioned on each spindle sustaining main radial loads of the cutters and free of end thrust contact with the cutters in a direction outwardly from the vertical axis of the drill, said spindle sustaining all said outward end thrust of the cutter.

15. In a roller boring drill a support, a spindle supported at its outer end thereby and extending downwardly and inwardly therefrom, and a roller cutter having a base cutting zone and a frusto-conical portion enclosing the free end of the spindle, roller bearings between the spindle and the cutter, said spindle having a peripheral bearing surface cooperating with the peripheral surfaces of the roller bearings and being further provided with additional surfaces cooperating with the cutter for relieving the ends of the roller bearings from all the thrusts imposed upon the conical part of the cutter.

16. In a roller boring drill a support, a spindle supported at its outer end thereby and extending downwardly and inwardly therefrom, and a roller cutter having a base cutting zone and a frusto-conical cutting zone, the cutter enclosing the free end of the spindle, roller bearings between the spindle and the cutter sustaining radial load on the cutter and intersectiong surfaces on the spindle cooperating with complemental surfaces on the cutter for sustaining all the other thrusts imposed upon the cutter.

17. An earth boring drill comprising a support, a spindle member projecting downwardly and inwardly from the support and having a free end, a frusto-conical cutter member enclosing the free end of the spindle member, roller bearings between the cutter member and the spindle member sustaining radial loads imposed on the cutter and having their inner ends contacting only one of said members, said spindle member at its free end having annular bearing surfaces at an angle to each other sustaining all other loads imposed upon the cutter and centering the cutter member in relation to the spindle member.

CLARENCE E. REED.